(12) United States Patent
Gohl

(10) Patent No.: US 6,912,653 B2
(45) Date of Patent: Jun. 28, 2005

(54) AUTHENTICATING COMMUNICATIONS

(76) Inventor: Erika Monika Gohl, Damaschkestr, 39, D-91088 Bubenreuth (DE)

( * ) Notice: Subject to any disclaimer, the term of this patent is extended or adjusted under 35 U.S.C. 154(b) by 580 days.

(21) Appl. No.: 09/767,617

(22) Filed: Jan. 23, 2001

(65) Prior Publication Data
US 2002/0099942 A1 Jul. 25, 2002

(51) Int. Cl.[7] .............................. H04L 9/32; H04L 9/12
(52) U.S. Cl. ....................... 713/155; 713/167; 713/168; 709/227; 709/228; 709/201
(58) Field of Search ................................ 713/155, 162, 713/167, 168, 170; 380/229, 232, 248; 705/67; 709/202, 203, 227, 228, 237

(56) References Cited

U.S. PATENT DOCUMENTS

| | | | |
|---|---|---|---|
| 5,196,840 A | | 3/1993 | Leith et al. .............. 340/825.3 |
| 5,644,118 A | * | 7/1997 | Hayashida .................. 235/379 |
| 5,657,390 A | | 8/1997 | Elgamal et al. ............... 380/49 |
| 5,793,302 A | | 8/1998 | Stambler .............. 340/825.34 |
| 6,151,395 A | | 11/2000 | Harkins ...................... 380/286 |
| 2003/0097567 A1 | * | 5/2003 | Terao et al. ................ 713/176 |

OTHER PUBLICATIONS

PCT Search Report, PCT/US01/08392, Aug. 2, 2001, 5 pps.

* cited by examiner

Primary Examiner—Justin T. Darrow
(74) Attorney, Agent, or Firm—Klarquist Sparkman, LLP (57) ABSTRACT

A method and apparatus are described that authenticates a first terminal to a second terminal. In one embodiment, the invention includes, requesting a string from the second terminal, obtaining the requested string from the second terminal, merging the obtained string with a password to create an identification code, receiving an authentication if the identification code matches an identification code expected at the second terminal and sending information from an information server to the authenticated first terminal. In a further embodiment, the string is a pseudo random number sequence and an element of an ordered series. Merging the string can include merging the string with the password using an applet at the first terminal, the applet executing an encryption algorithm with a unique merging key.

24 Claims, 3 Drawing Sheets

AUTHENTICATING COMMUNICATIONS

BACKGROUND OF THE INVENTION

1. Field of the Invention

The present invention relates generally to the field of secure communications between remote devices. More particularly, the invention relates to ensuring the authenticity of communications using passwords and encryption keys.

2. Description of the Related Art

Terminals on a computer network normally communicate over an electronic communication path that is open to everyone with access to the network. In each communicated packet, each terminal normally will identify itself with a header in each packet. In a closed network, these identification packets can be trusted as well as each terminal user on the network can be trusted. In an open network, for example the internet, and in networks that are insecure, such as wireless local area networks and wide area networks, it may be possible for outsiders to assume the identity of a user or terminal and gain access to the network without authorization. This can threaten the security and viability of the network. In e-commerce applications, it can result in purchases being made using someone else's identity.

Currently digital signatures are used in internet transactions in order to authenticate a user, i.e. determine that the user is who it purports to be. However, even in such systems the encrypted password is sent over the accessible network. In such networks, due to the normally insecure nature of the communication path, an encrypted password can be seen by anyone with access to the network including service providers and web administrators. In order to break the system security, it may not be necessary to decrypt the password. Sending the encrypted password may allow access to network transactions. Encrypting the password as is done with digital signature algorithms does not guarantee security because the protocol typically used in a net transaction will log the encrypted password with the user identification in files that may be accessible to outsiders. To eliminate this possibility, the password must be changed after every transaction. This requires, however, that the initiating request be unencrypted until the passwords are reset.

Some network systems, e.g. TCP/IP (Transfer Control Protocol/Internet Protocol) use sockets for identification. This provides another accessible location where passwords and user identities may be stored. The Secure Sockets Layer (SSL) and Transport Layer Security(TLS) protocols are widely used for e-commerce security on the World Wide Web, verifying the authenticity of Web sites, encrypting the transfer of sensitive data, and ensuring the integrity of information exchanged. SSL encrypts all messages beginning with identification but it requires RSA encryption (a patented public key encryption algorithm named for its developers Rivest, Shamir and Adleman). Another approach is Open SSH, a secure shell suite providing encryption for network services like remote login or remote file transfer. Open SSH encrypts all traffic (including passwords) to reduce eavesdropping, connection hijacking, and other network-level attacks. Additionally, Open SSH provides some secure tunnelling capabilities. These programs and many others use the complexity of the encryption algorithms to create the security. In both RSA and DES encryption significant computer resources are consumed in performing the encryption and encryption.

Accordingly, existing authentication systems do not provide enough security. Passwords can be captured either from a register in the server or the client or from the communications path. Even if the passwords are encrypted, they may still be used. In addition, the additional burden of encryption can tax the computational resources of the network. The present invention provides a flexible, scalable authentication approach. Users can be safely, accurately and securely identified. Passwords are very well protected and are not openly communicated. Instead a unique temporary identification code is sent. The identification code is changed frequently and is determined in a way that cannot be perceived by examining the transmitted messages. In addition, the present invention includes a counting mechanism using ordered random strings. This allows the system to easily track usage and cause passwords to expire after a certain amount of time or a certain amount of use. The passwords are also very well protected on the communicating terminals. While encryption is used, the values that are encrypted are small so that even very complex encryption can be performed without unduly burdening the resources available.

BRIEF SUMMARY OF THE INVENTION

A method and apparatus are described that authenticates a first terminal to a second terminal. In one embodiment, the invention includes, requesting a string from the second terminal, obtaining the requested string from the second terminal, merging the obtained string with a password to create an identification code, receiving an authentication if the identification code matches an identification code expected at the second terminal and sending information from an information server to the authenticated first terminal. In a further embodiment, the string is a pseudo random number sequence and an element of an ordered series. Merging the string can include merging the string with the password using an applet at the first terminal, the applet executing an encryption algorithm with a unique merging key.

Other features of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

The present invention provides reliable and secure authentication. This provides advantages for many different applications. In one embodiment, it can provide identification on a network, such as the world wide web, using a human readable password. In such an application, users who are not authenticated can be excluded from accessing e.g. a Web server. This can be used, for example, to restrict server access for time limited licenses.

In another embodiment, software can be licensed on-line. For the licensor, the present invention ensures that no one but the licensee uses the software, and that the licensee uses only as many licenses as are paid. For the licensee, the present invention provides ready access to the licensed software and updates over the network conveniently and quickly. The present invention can also be used for downloading products and for banking transactions.

The invention can be implemented by a software provider, service or product supplier or bank or it can be implemented by a separate authentication provider. In the description below, an identification server and an application server are shown. These servers can be the same or different devices with the same or different owners and operators. As will be seen below, if the identification server provides the authentication, then the application server does not have to track or monitor passwords and authentication.

Security Aspects

The security of the present invention can be analyzed with respect to two aspects. Password security refers to the ease with which the user's password or key can be discovered. Session security refers to the ease with which the communication path can be abused. The present invention allows for flexibility in its implementation in order to accommodate both security needs. At least three levels of password security are envisioned, although more or fewer levels are possible. The choice of level will depend on the amount of security and the expenditure desired. To a large extent, the security of the password is controlled by how the parts of the algorithm for passwords are kept. At a first level, all of the algorithm for using passwords is kept in an applet or other program on the user's machine. The applet is typically loaded to the user's machine from the net. In this case, the password can be discovered, if one gets access to the applet that is sent over the net, disassembles the code of the applet and tries all possible passwords as an input.

At a second level, the applet is not transmitted over the net. In this case, one must access the user's machine via the internet or a login, to get the password. One can then disassemble the Java code of the applet and try all possible passwords as input. At a third level, the applet or other program runs in its own user space to which no other program has access. This makes it more difficult to get access to the applet and then try out different passwords. These levels differ primarily in where the parts of the algorithms are kept.

Session security can be modified by controlling how many user identification transactions are required in a session. At a first level, each session has a single identification transaction. In such a case, if an outsider knows the password and the application's protocol, the outsider can assume the password of the user and thereby spoof the system during the session. At a second level, a new identification transaction is required for each significant transaction during the session. This limits the amount of time available during which one can use a discovered password or key. At a third level, each transaction has its own identification transaction. As with password security more or fewer levels are possible. The choice of level will depend on the amount of security and the expenditure desired.

System Architecture

Figure 1:
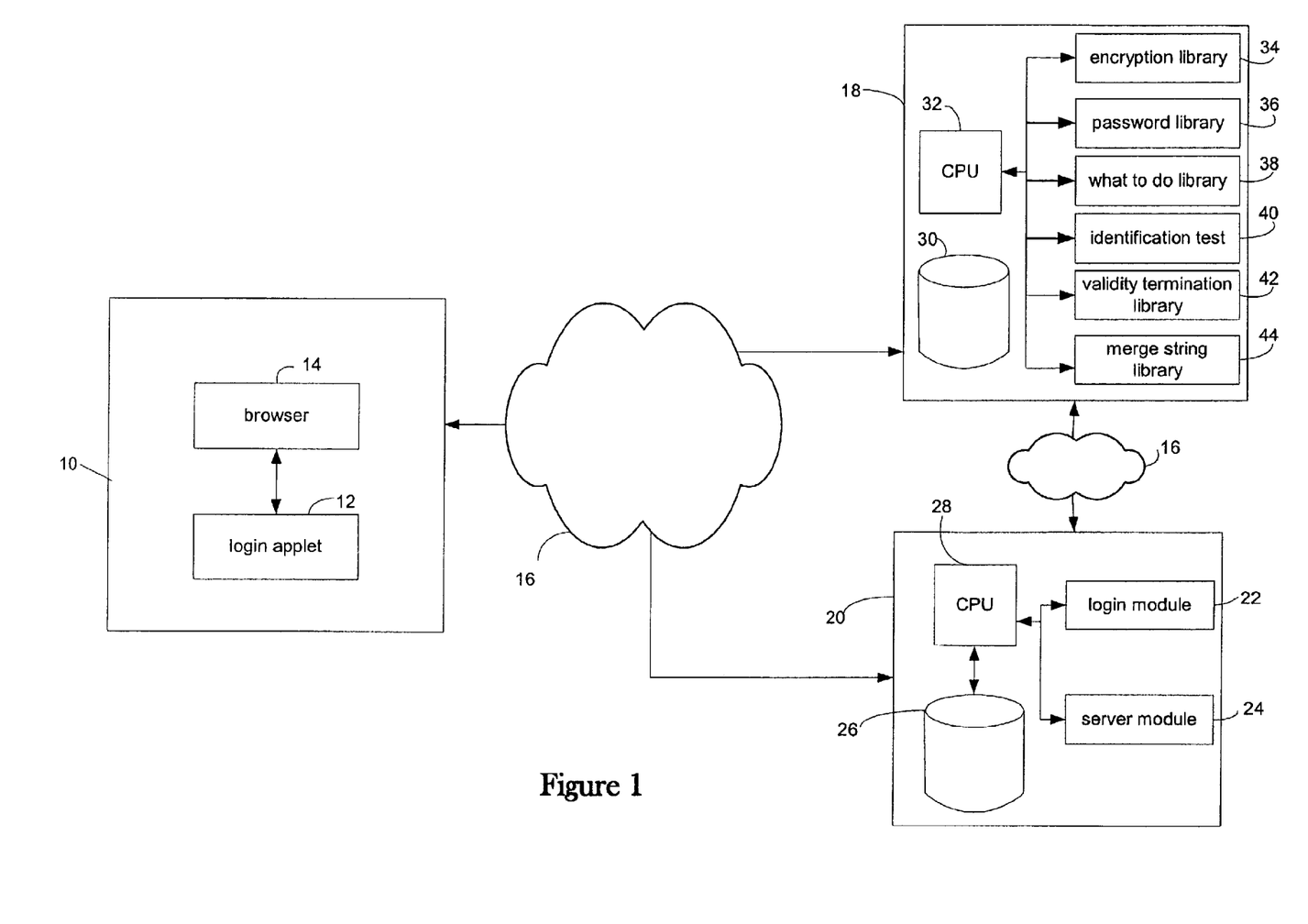
FIG. 1 is a block diagram illustrating an exemplary architecture of a communications system for implementing one embodiment of the present invention.

FIG. 1 shows an example of a hardware system suitable for implementing the present invention. In FIG. 1, each terminal is coupled to each other terminal over the internet. One network terminal, a client 10 with a login applet 12 and a browser 14 is connected through e.g. the internet 16 with a second terminal, an identification server 18 and a third terminal, an application server 20. The client terminal may be a mainframe, mini or microcomputer, a desktop, laptop or palmtop computer, a personal digital assistant (PDA), e-mail appliance, wireless telephone or any other computing device large or small.

The identification server 18 is also connected with the application server 20 through the internet 16. As mentioned above, the client may be connected to the application server through the identification server so that the identification server serves the applications to the client from the identification server. Alternatively, the application server can serve applications directly to the client after the identification server has authenticated the client. While in the present embodiment, the communications are shown as being through the internet 16, the present invention can also be applied to any other data path, including other private networks and radio communications channels.

The application server 20 contains a login module 22 and a server module 24 as is well-known in the art. Typically, the login module includes an HTML web page with a login applet. As is well-known in the art, the application server also includes a memory 26, typically including a mass storage device and a cache memory. The mass memory will typically contain the applications and other data that is to be served to the client as well as any other instructions for operating the server. The application server terminal also includes a processing unit 28 such as a CPU (central processing unit) designed for operation with web servers. The server may also include a variety of other input/output, user interface and communications facilities (not shown) as is well-known in the art.

The identification server 18 also contains memory 30 and a processing unit 32 similar to that of the identification server. Like the application server, this terminal may also include a variety of other input/output, user interface and communications facilities (not shown) as is well-known in the art. The identification server also contains several libraries. An encryption library 34 contains the encryption algorithms used by the applet at the client and is used to drive the testing process as contained in a validity test library 40 described below. A password and identification library 36 manages the passwords and identification codes. This is used by the testing and expiration processes. The expiration processes are contained in a validity termination library 42. A what-to-do library 38, used by the testing process 40, contains calls to HTML pages, and other processes which are guarded by the identification algorithm. In addition, there is a merge string library 44 containing a calculating function for the random merge strings creating process. This library can be used to customize the random string process to suit the needs of particular application servers. As is well-known in the art, all of these libraries are interconnected through the CPU at the server A variety of different approaches can be used for the interconnections, for example, scripting functions can be used in the library to call the processes. In alternate embodiments, the libraries can be substituted by customer libraries for each application. The libraries shown in FIG. 1 as well as the default libraries can be shared libraries, but the functionality can also be provided via CORBA (common object request broker architecture), OLE (object linking and embedding), RMS (record management services for Digital brand computers) or TCP/IP (transmission control protocol/internet protocol).

Information Flow

Figure 2:
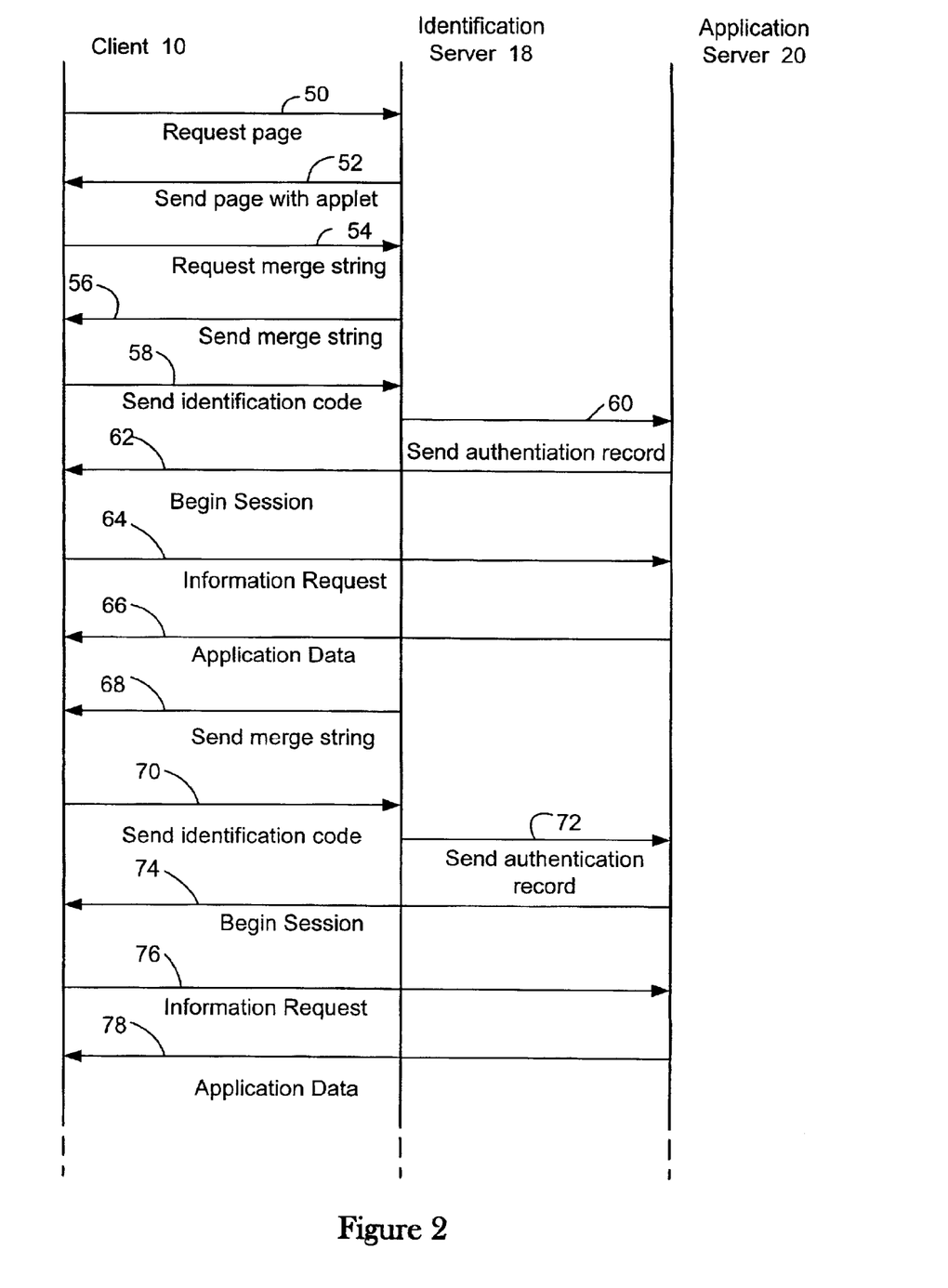
FIG. 2 is a high-level communications flow diagram of one embodiment of the present invention.

FIG. 2 shows a diagram of the information flow between the identification server 18, the application server 20 and the client 10 according to one embodiment of the present invention. While the invention is shown in the context of a server-client relationship, it is equally applicable to peers on a network, mainframe-terminal, unassociated servers, unassociated terminals of other types or any other communications architecture. In addition, while the invention is described in the context of a client obtaining information from a server, it is also applicable to a server obtaining information from a client. As will be seen from the following discussion, the present invention derives great benefit from frequently changing an identification code used for authentication.

To begin a session, the client sends a request to the identification server 50. This is typically answered by sending an HTML document back to the client 52. Before the session begins, the client can be initiated. To do this, a special program can be sent to and loaded onto the client machine that tracks passwords and encryption keys and performs the various encryption operations discussed herein. In one embodiment, this program is a log in applet written in Java for use with the Netscape Navigator internet browser, however other browsers including Microsoft Internet Explorer can be used instead. The log in applet works with a user password to log in the user for the session. In this embodiment, the communications discussed below occur over the internet with a server through the browser. The applet is transmitted from the server to the client over the internet as is well-known in the art. The user password can also be transmitted either from the server or to the client over the internet, however, the user password can be handled with more security. A variety of different security schemes including SSL, discussed above, can be applied to the log in applet and user password transactions.

For greater security, the applet and user password can be conveyed as a separate package over a dedicated telephone connection or other direct modem communications channel. It can also be sent through the mails or other courier as many banking passwords currently are. The user password is kept in a secure location at the identification server and does not change under normal operations. The user password can be kept in a secure location at the client or for greater security it can be required from the user with each log in. After the session has ended the password can then be erased by the log in applet as the session is closed. The initiation process 50, 52 is typically done every time a session begins. As is well-known in the art, each time the client accesses the web site of the identification server, the client can receive a new log in applet embedded in the HTML of the page. On the other hand, the user password is typically kept for a much longer period of time. Alternatively, if the applet and user password communication is not performed using conventional web transactions, the initiation process may be performed only once or it may be repeated at intervals that are or are not directly related to accessing the web site of the identification server. To initiate the process without a web transaction, the log in applet, already resident on the client, can receive the user password from the user without interacting with the identification server and then the first communication with the server will be a merge string request 54 discussed below.

The present invention allows the client to be authenticated to any applications server that can be accessed through the identification server. For particularly sensitive information, a different authentication account can be established for each application server. However, allowing the identification server to authenticate the client to many different application servers can ease secure communications.

After the user enters the user password, the client's applet asks the server through the browser for a merge string 54. The user password can be sent to the identification server at that time, but for increased security, it will be temporarily stored only at the client. If a cgi (common gateway interface) script is used, this is done by calling a cgi-script which creates a pseudo-random string of a particular length. The creation of the pseudo-random merge string is discussed in more detail below.

After the merge string is created, it is sent from the identification server to the client 56 and then merged at the client with the client's unique user password. The merged string and user password becomes the identification code that is used to authenticate the client. The merge string can be sent to the client encrypted or unencrypted. For improved security, the merge string is sent just once during the validity of the unique user password. If it is sent often, the merge string might be discovered by a hostile entity by repeatedly calling the identification procedure until an identification string is received. The identification string could be used to determine the merge string and then to log in to the network. Merging is discussed in more detail below. The merging is done by the applet resident on the client. In one embodiment, as discussed in greater detail below, the merge function is one to one, and it is designed to make it very difficult to calculate an inverse.

The server then receives the merged string and password in the form of the identification code from the client 58 and compares the received identification code to what it expected. This authenticates the client by ensuring not only that the client has the proper user password, but also that it has the proper merging algorithm. The identification server, as mentioned above has a copy of the encrypted user password, a copy of the merge string that it sent and a copy of the merging algorithm for that user. The encryption of the password and the record of the algorithm can be kept, for example, in a Windows Registry, in a separate database or in any other secure place, depending on the operating system and available applications software at the identification server. Finally, if the authentication checks out, the requested data is sent to the client, otherwise the connection is declined. In the embodiment shown in FIG. 2, the process of sending the data begins by informing the application server of the authenticated user 60.

Creation of a Merge String

When the client asks for a merge string 54, the server creates a pseudo-random string and writes this into a file. The file name or another register location contains an identification string sent by the client, for example a user identification number. In one embodiment, the pseudo-random merge strings are sent just once per session. As discussed above the period of validity of a user password is typically much longer than the period of validity of a merge string. In order to improve security, the random string can be included as a parameter of the HTML page sent 52 in the initiation process.

The strings can be truly random but it is sufficient that they appear to be random to an outsider trying to break the security of the authentication system. Typically, the merge string will be a pseudo-random number produced using a simple pseudo-random number generator function such as the "rand" function of the Java or C programming languages. In one embodiment, successive strings are ordered in order to reduce the likelihood that the same string is used twice. In such a case the random strings are created for each user using a linear ordering for each user and the previous string is stored at the server. In one embodiment, the ordered random strings have a maximal element. In this example, the elements of the linear ordering are strings over some linear ordered sign alphabet. A string $s_i$ is defined to be greater than some other string $s_j$ (in signs $s_i \supset s_j$) if and only if, the length (number of signs of the string) of $s_i$ is shorter than the length of $s_j$. In other words, if $s_i=a_1a_2 \ldots a_n$ and $s_j=b_1b_2 \ldots b_n$ where n is the length of the strings, th in the linear ordering of the sign alphabet, $a_k$ is less than $b_k$ (in sign $a_k<b_k$.). In a specific example, the alphabet used for the strings is a, b, ... z, A ... Z, 0, ... 9. In this case, the empty string is a maximal element of the ordering. Alternatively, to avoid using empty elements as a part of the strings set, "a" can be the maximal element. Each string induces a finite sequence of strings that are greater then the first. If a first string using this alphabet is the string "First" for instance, then the sequence continues: "Firss", "Firsr", ... "Firsa", "Firr9", "Firr8", ... "F", "E", ... "z". Alternatively, intergers can be used rather than a whole alphabet, but the integer string as can be seen from "First" is very much longer. The second random number after "First" is "Fiofo", if the random number between 1 and 1000000 is 12343. The third random number should be between 1000000 and 2000000, because it should be in the second cell and have 234234 as its random part. The corresponding sign sequence would be "Fdgnt" and so on.

The number of elements of any string can be computed as shown below. The number of elements greater than a string $s=a_1a_2 \ldots a_n$ equals:

$$|(s)|=f(a_n)+f(a_n-1)*z+ \ldots +f(a_1)*z^{n-1}$$

where z is the number of elements in the sign alphabet, (s) denotes the sequence induced by s, | | is the sign for the cardinality, the function f corresponds to the natural isomorphism between the sign alphabet the natural numbers, where the operator is "<". (in this example a to 0, b to 1, ... 9 to 62). For "First" we have: 475058094 as the corresponding number obtained by the formula above.

The number of greater strings can be divided into number cells. For example, every cell may have 1000000 numbers for one cell. The random string is then calculated by subtracting a random number from 1 to 1000000 from the index of the first element of the cell. The string is then computed using the corresponding index . In this case there are 475 possible random strings. After the 475 possible strings are used and have expired, a new ordering and a new first string is determined for the new ordering. The end of the series of strings can be used to trigger the expiration of the user password. In such a case, when a user does, for example, its 460th login, the user may be informed that the current user password will expire after 15 more sessions and a new user password must be ordered.

Merging the Random Merge String and User Password

As discussed above, after the client receives the merge string 56, it computes the identification code and sends it back to the server 58. The server performs the same merging operation in order to authenticate the user. If the server obtains the same identification code that it received from the client, then the client is authenticated. If the codes do not match up, then the client is not the client that it purports to be and access to the network and to the application server is denied. While a particular example of a merging function is described below, the precise nature of the merging function is not important. The primary purpose of the merging function is to develop a temporary password (the identification code) that the client can send over the insecure network without revealing the secret user password. The identification code is created based on the received merge string in a way that can easily be duplicated at the identification server but that cannot be easily duplicated without knowing the user password and the merging algorithm contained within the log in applet. The merging process described below has an advantage in that the identification code will be fairly long and appear to be random with an even distribution of values. This properties make it even more difficult to determine the user password and the algorithm.

The merging function provides much of the security of the present invention. Knowing the merging function and the merge string might allow one to calculate the output of the function for all possible user passwords. This output can be compared to the identification code sent to the server. If a match is found, then one has the user password and is able to identify oneself as the client. To avoid this occurrence, the log in applet that performs the merging can be installed on the client computer without transmitting it over the network. This hides the merging function from any other network users. To maintain the secrecy of the function, every user should get a different encrypting function for the user password or at least one of several different possible ones. For example, a triple DES algorithm can be used for the user password, where every user gets its own encryption key. Security can be enhanced further if the user's key cannot be read. This can be done, for example, if parts of this encryption function are kept in a space on the client where programs other than the login applet cannot access it.

To further enhance security, a key generating function can be used which generates a sequence of keys for every user. In this way, each key is used just once. The key generator should also be kept in a separate space on the client. The key generation functions should be kept at the client computer as well as on the server. Communication to the key generating functions can be done using TCP/IP, for example. If Java is used for the applet, the policy file can be set to restrict access to the important files containing keys, key generators and the user password, as is well-known in the art.

Figure 3:
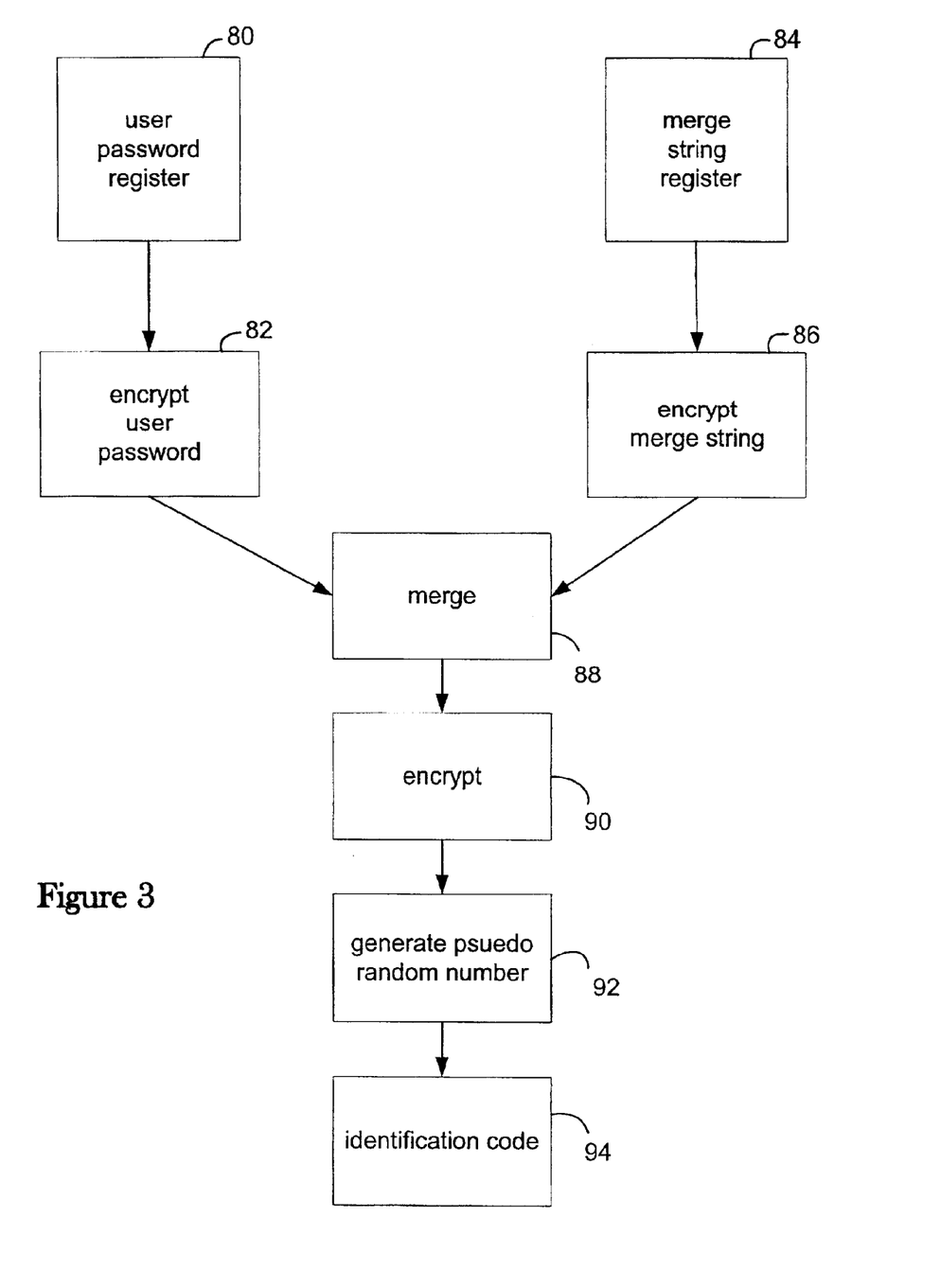
FIG. 3 is a block diagram illustrating the generation of an identification code according to one embodiment of the present invention.

An example of a merging strategy is presented in FIG. 3. If Netscape Navigator is used as a browser, since it does not provide any security functions, a Java language plug-in can be used in the applet to support merging. The Java.security.MessageDigest function can be used to encrypt the user password merged in a particular way with the random string. In other networks, using other software, the merging functions can be integrated into existing software security functions.

As shown in FIG. 3, the user password is fetched from a register 80 where it is stored in an encrypted form. It is then encrypted in the same or another way 82. Alternately, the encryption that is already applied in the register 80 can be used. These encryption functions are controlled by the applet and more or less encryption can be applied as desired. Similarly, the merge string is fetched from another register 84 where it is stored in an encrypted form. It is then encrypted again 86. Alternatively, since the merge string is a pseudo-random sequence with a shorter term validity, it can be stored unencrypted and applied to the merge function without encryption or as with the user password, it can be used in the form in which it is stored. The two elements are then merged 88 and the result is encrypted 90. The encrypted result can be used as the identification code 94 that is used to authenticate all of the communications that follow. The merge function can be a simple block addition. Such a simple block addition can be expressed as follows:

newString[$i$]=encryptedRandomString[$i$]+passwordString[$i$].

Alternatively for greater security, a permutation on both the encrypted password and encrypted random string can be performed as follows:

$$\text{newString}[i] = \text{encryptedRandomString}[i+\text{per1}(i)] + \text{passwordString}[i+\text{per2}(i)]$$

The encryption performed in the simple block addition can be used to bring the user password and the random merge string to be the same size. Alternatively, the user password and the merge string can be selected to be the same size. In some applications, however, this may make the user passwords unwieldy. If the password is just a few characters long, the resulting identification code may have portions which depend only on the random merge string. A good encryption algorithm can make the simple block merging unnecessary. In the permutation merging, the permutations, per1(int i) and per2(int i), are one-to-one functions, defined on the set of valid character indices of the encryption algorithm output word. (For java.encryption.MessageDigest, it is [0, . . . , 31], for DES, it is [0, . . . , 63]) If the permutations remain the same for all encryptions, then they do not make the algorithm very much safer. If they change, then the permutations increase the algorithm's safety.

To further enhance security, a further step 92 can be added. Instead of using the merged user password and merge string as the identification code, the merged user password and user string can be used as a seed to a pseudo-random number generation function 92. C and Java as well as many other programming languages include a function called "rand" that generates a pseudo-random number. The functions are simple enough that, if the same seed is used, the function will always generate the same pseudo-random number. From that first number, the function will continue to generate pseudo-random numbers and each number in this sequence of numbers will always be the same as long as the same seed is used. The log in applet can include a call to the rand function using the merged string and password as a seed to then generate the pseudo-random numbers. The pseudo-random numbers can be used as the identification code. As a result, the user password can be even more effectively concealed and the identification server, by using the same seed and the same rand function, can reliably reproduce all of the pseudo-random numbers generated by the log in applet and thereby authenticate the client.

Testing Validity of the Identification Code

The test function 40 at the identification server performs exactly the same encryption as the client's applet, using the random merge string sent to the user, and the user password which is kept in a database or the Registry on a Windows OS. If the merged password and merge string have been used as a seed for a pseudo-random number generator function, then this process is also duplicated at the server. After duplicating the process performed by the applet at the client, the identification server can compare the result to what has been received from the client. If the identification code test is performed with success, then the client has been authenticated and the user functions are called. The user password and merge string can be kept at the server in a file, however, this is less secure, especially on Unix-based server systems. If the passwords are kept in a file, then any error in configuration of the internet server can make everything, which a user of the internet server can access, accessible to the entire internet. In one embodiment, passwords or the password file are stored encrypted and not in plain text.

In FIG. 2, the user functions are called as determined in the what-to-do library 38 by sending authentication information regarding the client to the application server 60. This begins the exchange of information between client and application server. In the embodiment of FIG. 2, the application server identifies itself to the client to begin the session 62. The client can then send its information requests to the application server 64 and the application server can reply with the requested data 66. This exchange can occur through the identification server or separate and apart from the identification server. The exchange of data may be encrypted or not using techniques well-known in the art.

This exchange will continue normally until an event occurs that triggers the expiration of the merge string and requires a new merge string. The event is called either by the application server or the validity termination library at the identification library. As discussed above, the frequency with which the string must be changed can be selected based on the session security needs of the application. When the new string is required, the identification server will send a new random string to the client 68. This random string can be selected to be the next in the particular linear ordering for the particular client. The client then sends the new identification code based on merging the new string and user password 70. The code is tested by the identification server as before. If it passes the test, the identification server reconfirms authentication to the application server 72 and the data exchange continues. As before, the application server begins the exchange 74 which is followed by information requests from the client 76 and application data being sent in response 78.

Since the strings have a linear ordering with a maximal element, the maximal element can be used to give an expiration date to the user password. In this case, if the maximal element is reached, then the user password expires. A new user password initiation process begins to reset the password and the string series. In such a case, various warnings can be sent to the user in advance. Other events can also be used to trigger a new user password requirement such as elapsed time, frequency or amount of data used etc. The linear ordering and maximal element provide a convenient trigger for password expiration because reaching the maximal element is directly related to the amount of the client's authenticated communications.

Sending the Requested Data

As mentioned above, the data is communicated between the application server and the client. Any encryption used will depend on the security desired. The encryption need not be as complex as with prior art systems because of the security of the authentication. In one embodiment discussed above in which every user has its own keys for encryption of passwords and merge strings, the triple DES encryption used with the user's keys to encrypt the user password can also be used for encryption of the data. This is an extremely secure method, since if a version with a changing key is used, the encryption of the same text always looks different.

In one example given above, the data sent to the client was an HTML-page containing an applet which has the merge string as a parameter. This applet performs the requests to the web server and merges the merge string with the user password to form the identification code. Every request can contain this identification code. At one security level, closing the applet, invalidates the merge string and the corresponding identification code. The HTML files read from the web server can be temporary to prevent them from being captured and used later. If the identification code is valid for a long time, another client may also use it. However, if the identification code's duration is just for one session, there will not be enough time for another client to intercept and use the identification code. As mentioned above, by making the merge string part of an ordered sequence, it can be ensured that an identification code will not be reused until after the expiration of the user password.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. The specific details of these structures and constructs will also be understood by one skilled in the art.

The present invention includes various steps described above. The steps may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media or machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while embodiments of the present invention have been described with reference to authenticating users and sending secure communications over the internet, the method and apparatus described herein are equally applicable to intranet, extranet, local and wide area networks and peer-to-peer communications.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense and the invention is to be limited only be the claims set forth below.

What is claimed is:

1. A method for authenticating a first terminal to a second terminal comprising:
   requesting a string from the second terminal;
   obtaining the requested string from the second terminal;
   merging the obtained string with a user-entered, encrypted password to create an identification code;
   receiving an authentication if the identification code matches an identification code expected at the second terminal; and
   sending information from an information server to the first terminal.

2. The method of claim 1, wherein the string is a pseudo random number sequence.

3. The method of claim 1, wherein the string is an element of an ordered series.

4. The method of claim 1, wherein merging the string comprises performing a block addition of the string and the password.

5. The method of claim 1, further comprising opening another communications session using a string that is an element of an ordered series and wherein the string of the prior communications session is the preceding element of the same ordered series.

6. A method for authenticating a first terminal to a second terminal comprising:
   requesting a string from the second terminal;
   obtaining the requested string from the second terminal;
   merging the obtained string with a user-entered, encrypted password to create an identification code, wherein merging the string comprises merging the string with the password using an applet at the first terminal, the applet executing an encryption algorithm with a unique merging key;
   receiving an authentication if the identification code matches an identification code expected at the second terminal; and
   sending information from an information server to the first terminal.

7. The method of claim 6, further comprising closing the applet after sending the encrypted data and thereby invalidating the string.

8. A method for authenticating a first terminal to a second terminal comprising:
   requesting a string from the second terminal;
   obtaining the requested string from the second terminal;
   merging the obtained string with a password to create an identification code, wherein merging the string comprises performing a block addition of the string and the password, wherein performing a block addition further comprises performing a permutation to the string and to the password and adding the permutated string and the permutated password;
   receiving an authentication if the identification code matches an identification code expected at the second terminal; and
   sending information from an information server to the first terminal.

9. A method for authenticating a first terminal to a second terminal comprising:
   requesting a string from the second terminal;
   obtaining the requested string from the second terminal, wherein obtaining the requested string comprises receiving a web page containing a program for generating requests and the string;
   merging the obtained string with a password to create an identification code;
   receiving an authentication if the identification code matches an identification code expected at the second terminal; and
   sending information from an information server to the first terminal.

10. The method of claim 9, wherein the web page is an HTML page and the program is an applet.

11. A method for authenticating a first terminal to a second terminal comprising;
   creating a string and storing it in association with an identification of a first terminal;
   sending the string to the first terminal;
   receiving an identification code from the first terminal composed by merging the sent string with a sender password;

comparing the identification code to an expected identification code; and if the identification code matched an expected identification code, then authenticating the first terminal.

12. The method of claim 11, wherein the string is a pseudo random number sequence.

13. The method of claim 11, wherein the string is an element of an ordered series.

14. The method of claim 11, wherein merging the string comprises performing a block addition of the string and the password.

15. The method of claim 14, wherein performing a block addition further comprises performing a permutation to the string and to the password and adding the permutated string and the permutated password.

16. The method of claim 11, further comprising opening another communications session using a string that is an element of an ordered series and wherein the string of the prior communications session is the preceding element of the same ordered series.

17. A method for authenticating a first terminal to a second terminal comprising:

creating a string and storing it in association with an identification of a first terminal;

sending the string to the first terminal;

receiving an identification code from the first terminal composed by merging the sent string with a sender password, wherein merging the string comprises merging the string with the password using an applet at the first terminal, the applet executing an encryption algorithm with a unique merging key;

comparing the identification code to an expected identification code; and if the identification code matched an expected identification code, then authenticating the first terminal.

18. The method of claim 17, further comprising closing the applet after sending the encrypted data and thereby invalidating the string.

19. A method for authenticating a first terminal to a second terminal comprising:

creating a string and storing it in association with an identification of a first terminal;

sending the string to the first terminal, wherein sending the string comprises sending a web page containing a program for generating requests and the string;

receiving an identification code from the first terminal composed by merging the sent string with a sender password;

comparing the identification code to an expected identification code; and if the identification code matched an expected identification code, then authenticating the first terminal.

20. The method of claim 19, wherein the web page is an HTML page and the program is an applet.

21. An authentication terminal comprising:

a merge string library coupled to a processor to create a merge string and to store it in association with an identification of a second terminal;

an output device to send the merge string to the second terminal;

an input device to receive an identification code from the second terminal, the identification code being composed by merging the sent string with a second terminal password; and an identification test library coupled to the processor to compare the identification code to an expected identification code and if the identification code matches an expected identification code, to authenticate the second terminal.

22. The terminal of claim 21, wherein the string is an element of an ordered series.

23. An authentication terminal comprising:

a merge string library coupled to a processor to create a merge string and to store it in association with an identification of a second terminal;

an output device to send the merge string to the second terminal;

an input device to receive an identification code from the second terminal, the identification code, being composed be merging the sent string with a second terminal password;

an identification test library coupled to the processor to compare the identification code to an expected identification code and if the identification code matches an expected identification code, to authenticate the second terminal; and an encryption library coupled to the processor to generate the expected identification code by merging the string with the second terminal password using an encryption algorithm with a merging key unique to the second terminal.

24. An authentication terminal comprising:

a merge string library coupled to a processor to create a merge string and to store it in association with an identification of a second terminal;

an output device to send the merge string to the second terminal;

an input device to receive an identification code from the second terminal, the identification code being composed by merging the sent string with a second terminal password, wherein the terminal is a web server, wherein the input device and the output device communicate over the web and wherein the terminal transmits a web page to the second terminal containing a program for merging the second terminal password and the merge string; and an identification test library coupled to the processor to compare the identification code to an expected identification code and if the identification code matches an expected identification code, to authenticate the second terminal.

* * * * *

UNITED STATES PATENT AND TRADEMARK OFFICE
CERTIFICATE OF CORRECTION

PATENT NO.         : 6,912,653 B2
APPLICATION NO. : 09/767617
DATED              : June 28, 2005
INVENTOR(S)        : Erika Monika Gohl It is certified that error appears in the above-identified patent and that said Letters Patent is hereby corrected as shown below:

Column 7, line 8, "th" should read --then there is an index k such that,--.

Signed and Sealed this

Thirty-first Day of July, 2007

JON W. DUDAS
*Director of the United States Patent and Trademark Office*